(12) United States Patent
Harrill

(10) Patent No.: US 7,415,771 B2
(45) Date of Patent: Aug. 26, 2008

(54) APPARATUS ONBOARD A VEHICLE FOR INSTRUCTING AXLE ALIGNMENT

(76) Inventor: Mitchell Craig Harrill, 140 Jenkins Rd., Rossville, GA (US) 30741

( * ) Notice: Subject to any disclaimer, the term of this patent is extended or adjusted under 35 U.S.C. 154(b) by 0 days.

(21) Appl. No.: 11/280,794

(22) Filed: Nov. 16, 2005

(65) Prior Publication Data

US 2006/0107538 A1 May 25, 2006

Related U.S. Application Data

(60) Provisional application No. 60/630,149, filed on Nov. 20, 2004.

(51) Int. Cl.
*G01B 7/31* (2006.01)
(52) U.S. Cl. ............... 33/264; 33/203.18; 340/438; 340/686.2
(58) Field of Classification Search ............ 33/264, 33/288, 600, 613, 645, 203.18, 203.19, 203.2; 340/438–440, 686.2, 901
See application file for complete search history.

(56) References Cited

U.S. PATENT DOCUMENTS

| | | | |
|---|---|---|---|
| 2,479,723 A | 8/1949 | Brown | |
| 2,845,718 A | 8/1958 | Keymer | |
| 3,137,076 A | 6/1964 | Hurst | |
| 3,279,084 A | 10/1966 | Bohlen | |
| 3,325,905 A | 6/1967 | Hurst | |
| 3,566,476 A | 3/1971 | McWhorter | |
| 3,686,770 A | 8/1972 | Davis | |
| 3,962,796 A | 6/1976 | Johnston | |
| 4,055,899 A | 11/1977 | Dean | |
| 4,302,104 A * | 11/1981 | Hunter | 33/288 |
| 4,347,668 A | 9/1982 | Johnston | |
| 4,569,140 A * | 2/1986 | Hobson | 33/203.18 |
| 4,679,327 A * | 7/1987 | Fouchey et al. | 33/203.13 |
| 4,800,651 A | 1/1989 | Hanlon | |
| 4,942,667 A | 7/1990 | Fournier | |
| 4,967,480 A * | 11/1990 | DeLuca | 33/288 |
| 5,157,838 A | 10/1992 | Sims | |
| 5,386,639 A | 2/1995 | Colarelli | |
| 5,433,296 A * | 7/1995 | Webberley | 340/518 |
| 5,488,472 A * | 1/1996 | January | 33/288 |
| 5,948,024 A * | 9/1999 | O'Mahony et al. | 33/288 |
| 6,021,576 A | 2/2000 | Campbell | |
| 6,082,011 A | 7/2000 | Phillips | |
| 6,226,879 B1 * | 5/2001 | Baird | 33/203.18 |
| 6,233,837 B1 | 5/2001 | Hagelthorn | |
| 6,397,448 B1 | 6/2002 | Cobb | |
| 6,405,109 B1 | 6/2002 | Kyrtsos | |
| 6,571,481 B1 * | 6/2003 | Weiss | 33/600 |
| 6,772,524 B2 * | 8/2004 | Machek | 33/203.18 |

(Continued)

*Primary Examiner*—G. Bradley Bennett

(57) ABSTRACT

A method and apparatus that remains onboard a tractor and semi trailer vehicle for readily providing axle alignment instruction to an operator. The apparatus includes at least one indicator (28) for detecting an axle's thrust line relative to the vehicle's centerline. At least one sensor (40) for detecting the position of indicator (28) relative to the position of sensor (40). Upon axle deviation, indicator (28) position changes relative to sensor (40). Sensor (40) detect the change in the position of indicator (28). At least one signal is generated and transmitted to at least one receiver (68). Receiver (68) communicates the relation between indicator (28) and sensor (40) as alignment instruction of a particular axle (front or rear), particular side (left or right), particular direction in which to realign the axle (forward or rearward), and concludes when the axle's alignment is correct.

17 Claims, 8 Drawing Sheets

U.S. PATENT DOCUMENTS

| | | |
|---|---|---|
| 6,886,266 B2 * | 5/2005 | Kidd et al. ............... 33/203.18 |
| 2002/0196136 A1 * | 12/2002 | Gagnon ..................... 340/438 |
| 2004/0163265 A1 | 8/2004 | Helms |
| 2005/0005461 A1 | 1/2005 | Rohrig |
| 2005/0102073 A1 * | 5/2005 | Ingram, II ................... 340/442 |
| 2007/0137053 A1 * | 6/2007 | Ball ............................ 33/264 |

* cited by examiner

APPARATUS ONBOARD A VEHICLE FOR INSTRUCTING AXLE ALIGNMENT

CROSS-REFERENCE TO RELATED APPLICATION

This application claims the benefit of U.S. Provisional Patent Application Ser. No. 60/630,149, filed Nov. 20, 2004.

FEDERALLY SPONSORED RESEARCH

Not Applicable

SEQUENCE LISTING OR PROGRAM

Not Applicable

BACKGROUND OF THE INVENTION

1. Field of the Invention

The present invention relates a method and apparatus that remains onboard a tractor and semi trailer vehicle for readily instructing axle alignment to an operator.

2. Description of Prior Art

Since the beginning of the tractor and semi trailer vehicle, alignment technicians have relied on various techniques for checking and correcting axle alignment. These techniques include using devices such as measuring tapes, strings, lasers, tram bars, devices attached to the wheels, devices attached to the kingpin, and the latest to this era, computer projecting imagery with printout capabilities. However, all of these devices depend on an operator to setup and measure the vehicle's alignment in a static position and often with the wheels elevated in order to compensate for tire and wheel run-out before anyone could diagnose axle alignment.

Fleet vehicles such as a semi trailer should seriously be maintained for proper axle alignment, especially those with tandem axles, since these vehicles are dangerously transporting the heaviest loads which can be detrimental to axle alignment through curbing and poor road conditions.

Incorrect axle alignment occurs when an axle becomes deviated from the original drive path of the vehicle. Deviation of a single rear axle will cause the tires to automatically roll to one side of the vehicle's centerline. The vehicle then appears to be rolling awry to the normal direction of travel. This alignment causes reduced fuel mileage, increased rolling resistance and driver fatigue from constant correction of the vehicle due to poor handling characteristics associated with this type of alignment.

With tandem axle combinations, both axles must be parallel to one another to minimize scrubbing between the tires and the roads surface. If one axle becomes deviated from the other, a tandem scrub angle occurs. This is the angle formed by two thrust lines of a tandem axle vehicle. The term (thrust line) used in this document represents the direction that the axle points compared to the vehicle's centerline (shown in FIG. 3).

Upon deviation of a tandem axle the driver is forced to turn the front steer axle to offset the push of the tandem axles in order to keep the vehicle moving straight ahead. This causes a constant scrubbing between each tire on the vehicle and the roads surface. The results are reduced fuel mileage, driver fatigue from poor handling of the vehicle, excessive premature tire wear, and an increase in tire temperature. Tire temperature can be a contributing factor for the rapid disintegration of the tire's tread which is hazardous and often seen laying along the roadway.

Most axle alignment problems are unseen to the eye. Because of this fact it possible to overlook alignment problems that might exist with the axles for a long period of time, since many of these problems will take several hundred to even thousands of miles to manifest themselves and become a contention to the driver.

There are several types of axle alignment devices found in prior art which include devices that are attached and removed, drive-on alignment devices, and an onboard axle misalignment monitor.

Attach and remove devices belong to U.S. Pat. No. 2,479,723 by Brown (1949), U.S. Pat. No. 2,845,718 by Keymer (1958), U.S. Pat. No. 3,279,084 by Hinden (1966), U.S. Pat. No. 3,325,905 by Hurst (1967), U.S. Pat. No. 3,566,476 by McWhorter (1971), U.S. Pat. No. 3,686,770 by Davis (1972), U.S. Pat. No. 3,962,796 by Johnston (1976), U.S. Pat. No. 4,347,668 by Johnston (1982), U.S. Pat. No. 4,800,651 by Hanlon (1989), U.S. Pat. No. 4,942,667 by Fournier (1990), U.S. Pat. No. 5,157,838 by Sims (1990), U.S. Pat. No. 6,021,576 by Campbell (2000), U.S. Pat. No. 6,082,011 by Phillips (2000), U.S. Pat. No. 6,233,837 by Hagelthorn (2001), U.S. Pat. No. 6,397,448 by Cobb (2002), U.S. Pat. No. 6,435,044 by Adolph (2002), U.S. Pat. No. 6,886,266 by Kidd (2005), U.S. pre-grant 20040163265 by Helms, and pre-grant 20050005461 by Rohrig. However, setup of the above mentioned alignment devices requires time and precision. Obtaining the same alignment results are often difficult when used by different technicians.

Drive-on alignment devices belong to U.S. Pat. No. 3,137,076 by Hurst (1964), U.S. Pat. No. 4,005,899 by Dean (1997), and U.S. Pat. No. 5,386,639 by Colarelli (1995). These devices are large and not easily transported, which eliminates the benefit of field alignment.

U.S. Pat. No. 6,405,109 B1 by Kyrtsos and Huang (2002) discloses a monitoring method and system mounted onboard a vehicle which determines axle misalignment and tire wear while the vehicle is driven. Axle misalignment is determined by monitoring the lateral acceleration values on an axle over a certain amount of time, such as the distance traveled over a long trip, and monitoring the vertical acceleration values which are proportional to the ratio of the weight on each axle. Then calculating and comparing one axle's data to the other, a prediction of the amount of axle misalignment and tire wear can be made. Concluding that the final ratio calculated determines that one axle is more misaligned than the other. However, this system determines axle misalignment over a traveled period of time, delaying important alignment information which allows the continuation of premature tire wear, and further delays vehicle operating efficiency while waiting on final calculations.

CONCLUSION—PRIOR ART

After observing the prior patented alignment devices, it becomes apparent that there is still a need to have an apparatus that eliminates setup and complicated analysis which is associated with prior art alignment devices. A further need is for an apparatus which in the event of axle deviation readily communicates axle realignment instruction. A still further need is for an apparatus that allows repeatable positioning of the axle when performed by different technicians.

THE INVENTION

Objects and Advantages

Accordingly, several objects and advantages of the present invention are:
(a) to provide an apparatus that remains onboard a tractor and semi trailer vehicle which saves valuable time by eliminating setup and complicated analysis associated with prior art alignment devices;

(b) to provide an apparatus that allows repeatable positioning of the axle when performed by different technicians;
(c) to provide an apparatus for a vehicle that readily communicates axle deviation, notifying to the operator that axle realignment is necessary;
(d) to provide an apparatus that in the event of axle deviation simply instructs which axle, which side, which direction to realign the axle, and instructs when axle alignment is correct;
(e) to provide an apparatus that allows the alignment of a semi trailer axle without detaching the tractor from the trailer.

Further objects and advantages will become apparent from a consideration of the ensuing description and drawings.

BRIEF SUMMARY OF THE INVENTION

In accordance to the present invention, a method and apparatus for instructing axle alignment of a vehicle includes at least one indicator permanently attached to the vehicle for detecting an axle's thrust line relative to the vehicle's centerline. At least one sensor permanently attached to the vehicle for detecting the indicator's position relative to the sensor's position. Upon axle deviation the indicator's position changes relative to the sensor. The sensor detects the change in the indicator's position and generates at least one signal determined by the position of the indicator. The signal is generated and transmitted to at least one receiver. The receiver communicates the relation between the indicator and the sensor as axle alignment instruction to an operator. The instructions explain which vehicle (tractor or trailer), which axle (front or rear), which side of the axle (left or right), which direction to realign the axle (forward or rearward), and when axle alignment is correct.

Figure 1:
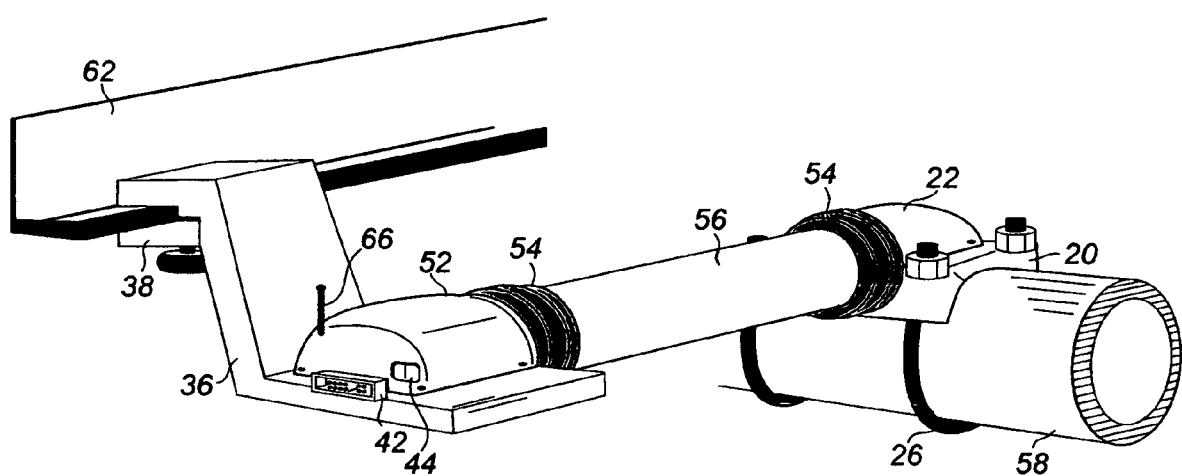
FIG. 1 shows the alignment apparatus assembled.

DRAWING—REFERENCE NUMERALS 20 mounting plate
22 plate cover
24 opening
26 U type bolts
28 indicator
30 slid able linkage
32 hinge
34 position sensor
36 sensor support bracket
38 clamp
40 sensor
42 wiring connection
44 reset switch
46 indicator guide
48 slot
50 longitudinal grove
52 sensor cover
54 flex boot
56 housing tube
58 axle
60 deviation
62 frame rail
64 sensor centerline
66 antenna
68 receiver
70 vehicle centerline
72 direction of travel
74 rear axle thrust line
76 tandem scrub angle
78 electronic distance measuring device

FLOWCHART—REFERENCE NUMERALS—FIG. 8

100 Start
102 Read OP: Read Operations for front and rear axle position sensor's left and right sides
106 RL>0: REAR axle position sensor lower LEFT side is greater value than 0
108 RL<0: REAR axle position sensor upper LEFT side is less value than 0
112 RR>0: REAR axle position sensor lower RIGHT side is greater value than 0
114 RR<0: REAR axle position sensor upper RIGHT side is less value than 0
118 Adjust Left Rear Axle Forward
120 Adjust Right Rear Axle Rearward
124 Adjust Right Rear Axle Forward
126 Adjust Left Rear Axle Rearward
206 FL>0: FRONT axle position sensor lower LEFT side is greater value than 0
208 FL<0: FRONT axle position sensor upper LEFT side is less value than 0
212 FR>0: FRONT axle position sensor lower RIGHT side is greater value than 0
214 FR<0: FRONT axle position sensor upper RIGHT side is less value than 0
218 Adjust Left Front Axle Forward
220 Adjust Right Front Axle Rearward
224 Adjust Right Front Axle Forward
226 Adjust Left Front Axle Rearward
250 OP=0?: Are Operations equal to 0?
260 Alignment correct
275 Loop connector
295 Connector for results
300 Receive results
350 Stop

DETAILED DESCRIPTION OF THE PREFERRED EMBODIMENTS—FIGS. 1-3

Figure 2:
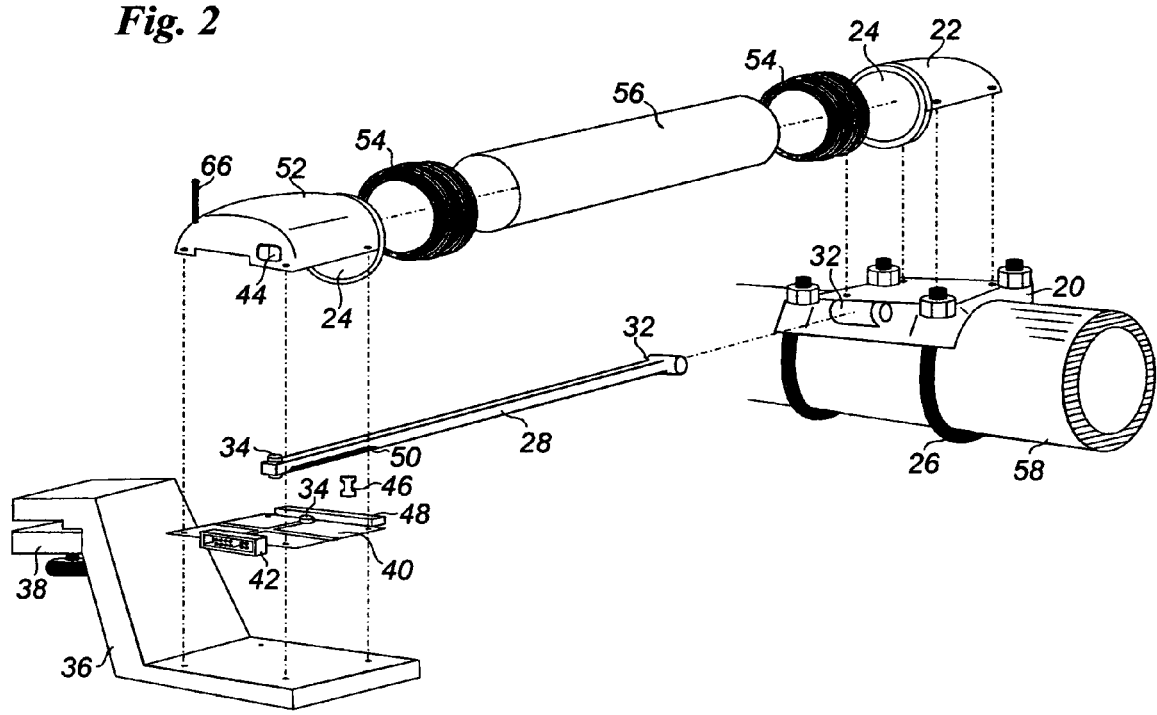
FIG. 2 shows a breakdown of the embodiments of the alignment apparatus.

FIG. 1 shows the preferred embodiments of the present apparatus assembled and FIG. 2 shows the apparatus disassembled. A mounting plate 20 is attached to axle 58 by U shaped bolts 26. A sensor support bracket 36 is attached to the inside section of frame rail 62. A sensor 40 is attached to sensor support bracket 36.

Sensor support bracket 36 should be attached to only one side of frame rail 62 and not to a cross-member of the vehicle. Attaching to the cross-member allows sensor support bracket 36 to skew if the frame becomes damaged and a diamond condition occurs. However, by attaching sensor support bracket 36 to only one side of frame rail 62 will allow instructions that will compensate for the diamond condition. Support bracket 36 may be attached using a combination of clamp 38 and Fusionbond (not shown) or any other means which may be accepted by the vehicle manufacture. Fusionbond can be purchased from Hemon Manufacturing, Inc. USA.

An indicator 28 having one end attached to a hinge 32 located on mounting plate 20. The other end of indicator 28 is connected to sensor support bracket 36 coupled by an indicator guide 46. Indicator guide 46 is inserted into a longitudinal groove 50 located at the end of indicator 28 and inserted into a slot 48 positioned transverse to sensor 40. The connection of hinge 32 and indicator guide 46 maintains the relation between indicator 28 and sensor 40 by allowing indicator 28 to slide left, right, forward and rearward of a sensor centerline 64 during suspension travel and axle deviation, shown in FIGS. 4 and 5.

In FIG. 2 a plate cover 22 having an opening 24 in one side is attached to mounting plate 20. A sensor cover 52 having an opening 24 which is equivalent to opening 24 of plate cover 22. Sensor cover 52 is placed over sensor 40 and attached to sensor support bracket 36. Opening 24 of plate cover 22 and opening 24 of sensor cover 52 face one another with flex boots 54 and housing tube 56 connected between indicator 28 is projected or extended through opening 24 of plate cover 22 and through housing tube 56, flex boots 54, and through the opening 24 of sensor cover 52. Indicator 28 is to line up with the center of sensor 40. Housing tube 56 and flex boots 54 are for keeping indicator 28 clean from road and weather conditions.

A wiring connection 42 plugs the apparatus into the vehicle's wiring for power during operation of the vehicle. An auxiliary battery (not shown) is used with an on/off or reset switch 44 for checking and correcting axle alignment when the vehicle is not in service and electrical power is unavailable.

A position sensor 34 is attached to sensor 40 along with a second position sensor 34 attached to indicator 28. Alternatively, these two sensors 34 can be attached to only indicator 28 or to only sensor 40. These two sensors 34 when aligned with sensor centerline 64 (shown in FIGS. 4 and 5) generate a correct axle alignment signal. Electronics containing a wireless transmitter (not shown) is connected to position sensors 34 and sensor 40. An antenna 66 radiates a wireless signal to a receiver 68. Receiver 68 (shown in FIG. 6) is used for instructing axle alignment to an operator.

Figure 3:
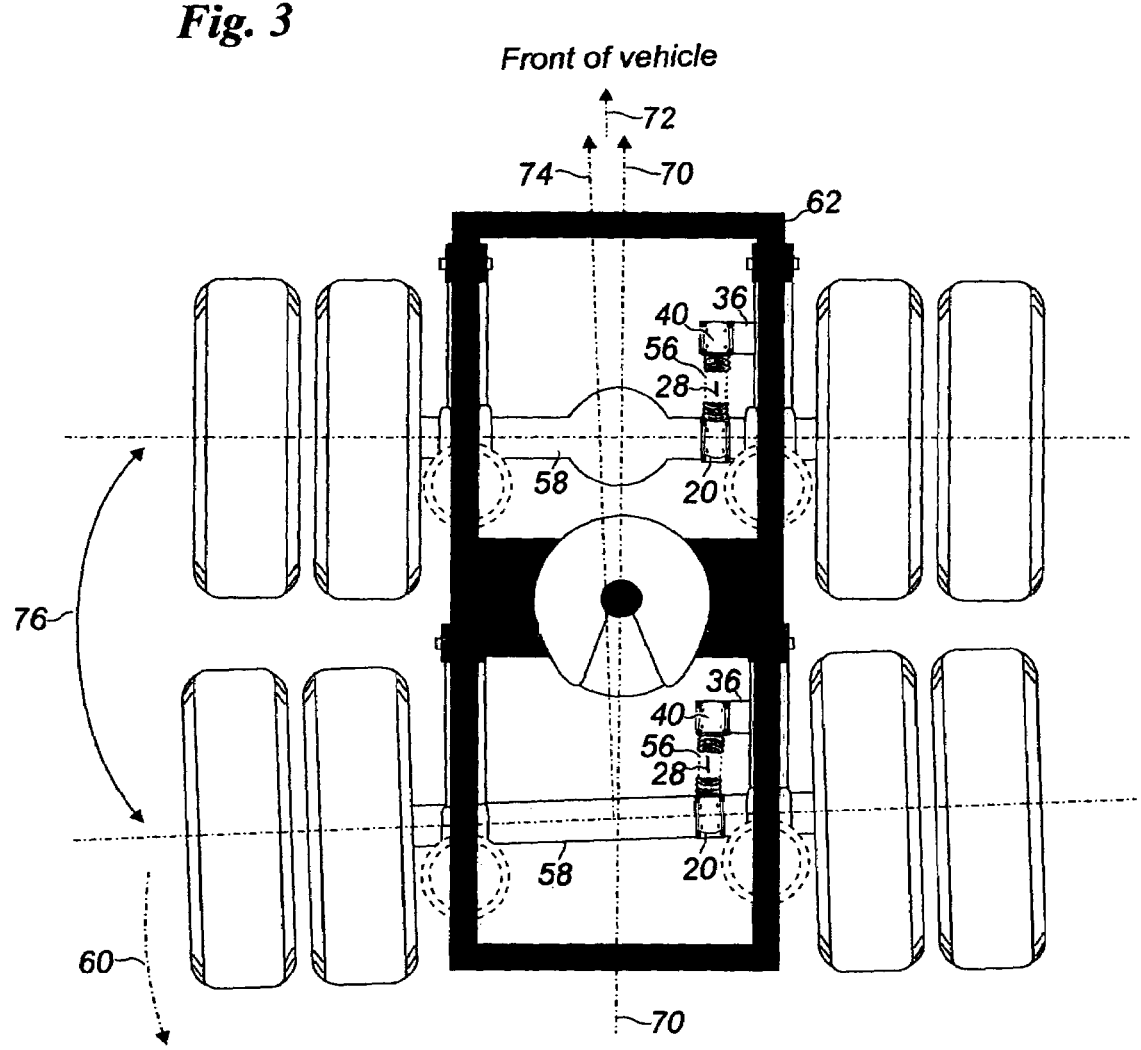
FIG. 3 shows a deviated rear axle of a tractor trailer with the present invention mounted in an operable position.

FIG. 3 shows a top view of the preferred operating arrangement of the present apparatus connected to a tractor trailer frame and tandem axles. The apparatus shows mounting plate 20, indicator 28, housing tube 56, sensor 40, and sensor support bracket 36. The front axle 58 is shown aligned correctly to vehicle centerline 70. The rear axle 58 shows axle deviation 60 that changes the rear axle's thrust line 74 which in turn causes a tandem scrub angle 76 to occur. The vehicle automatically compensates for scrub angle 76 by rolling to one side of vehicle centerline 70 and now appears deviated from normal direction of travel 72.

Alternative Embodiments—FIGS. 1-5, and 7

The preferred embodiment of the present invention shown in FIGS. 1-3 have parts which may not be necessary in order for the apparatus to function and could be omitted if desired. These parts include mounting plate 20, plate cover 22, hinge 32, sensor 34, housing tube 56, flex boots 54 and sensor bracket 36. For example, indicator 28 can attached directly to axle 58 by clamps or other means of attachment, completely eliminating mounting plate 20 and plate cover 22. Sensor 40 can attach frame rail 62, eliminating bracket 36. Also housing tube 56 and flex boots 54 could be removed. However, removing housing tube 56 may cause unnecessary opening or cleaning of sensor 40. Also position sensors 34 may be alternatively arranged, substituted, or omitted.

Figure 4:
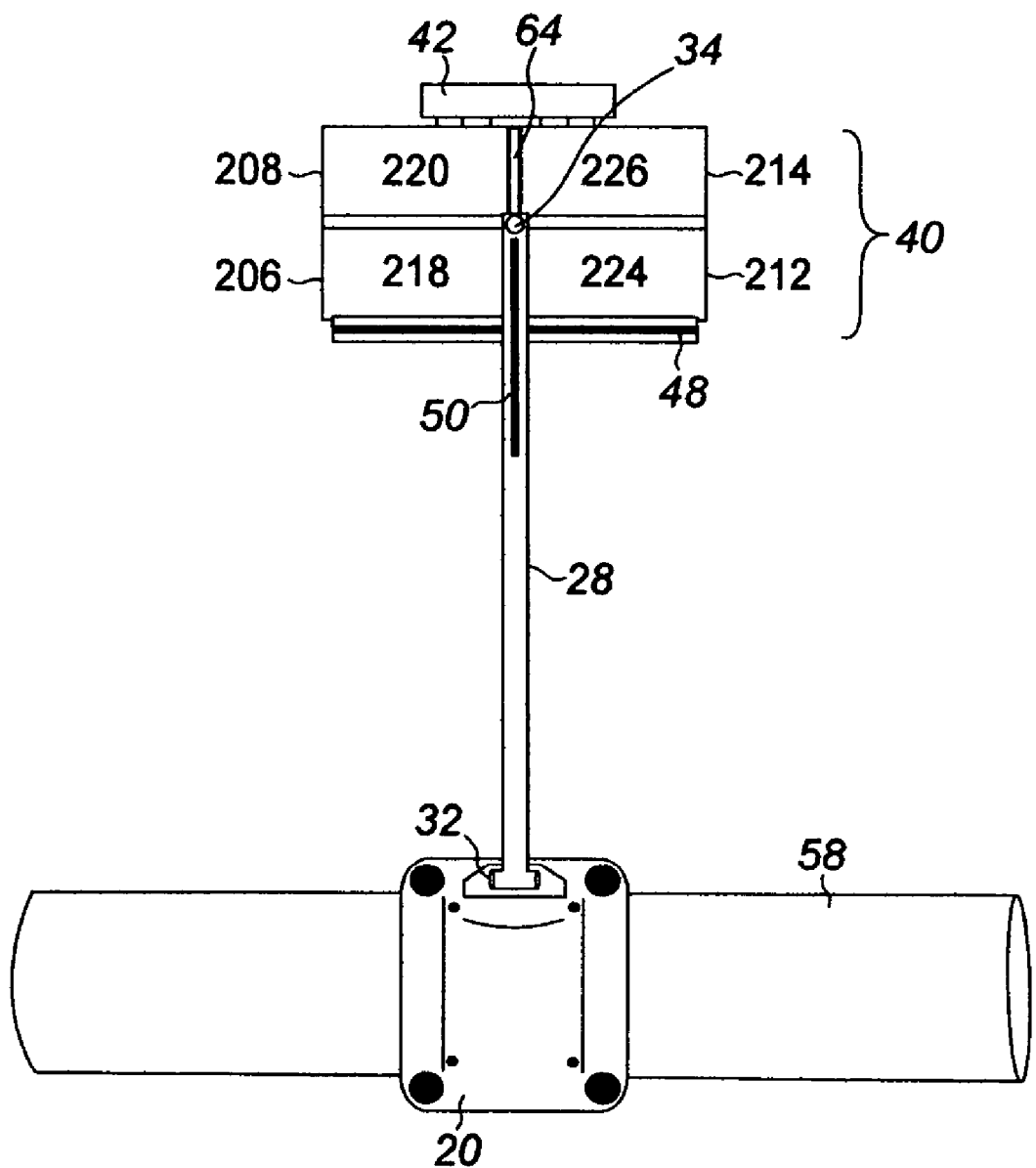
FIG. 4 shows the apparatus attached to an axle in a correct axle alignment position, illustrating the relation between the indicator, axle, and sensors.
Figure 5:
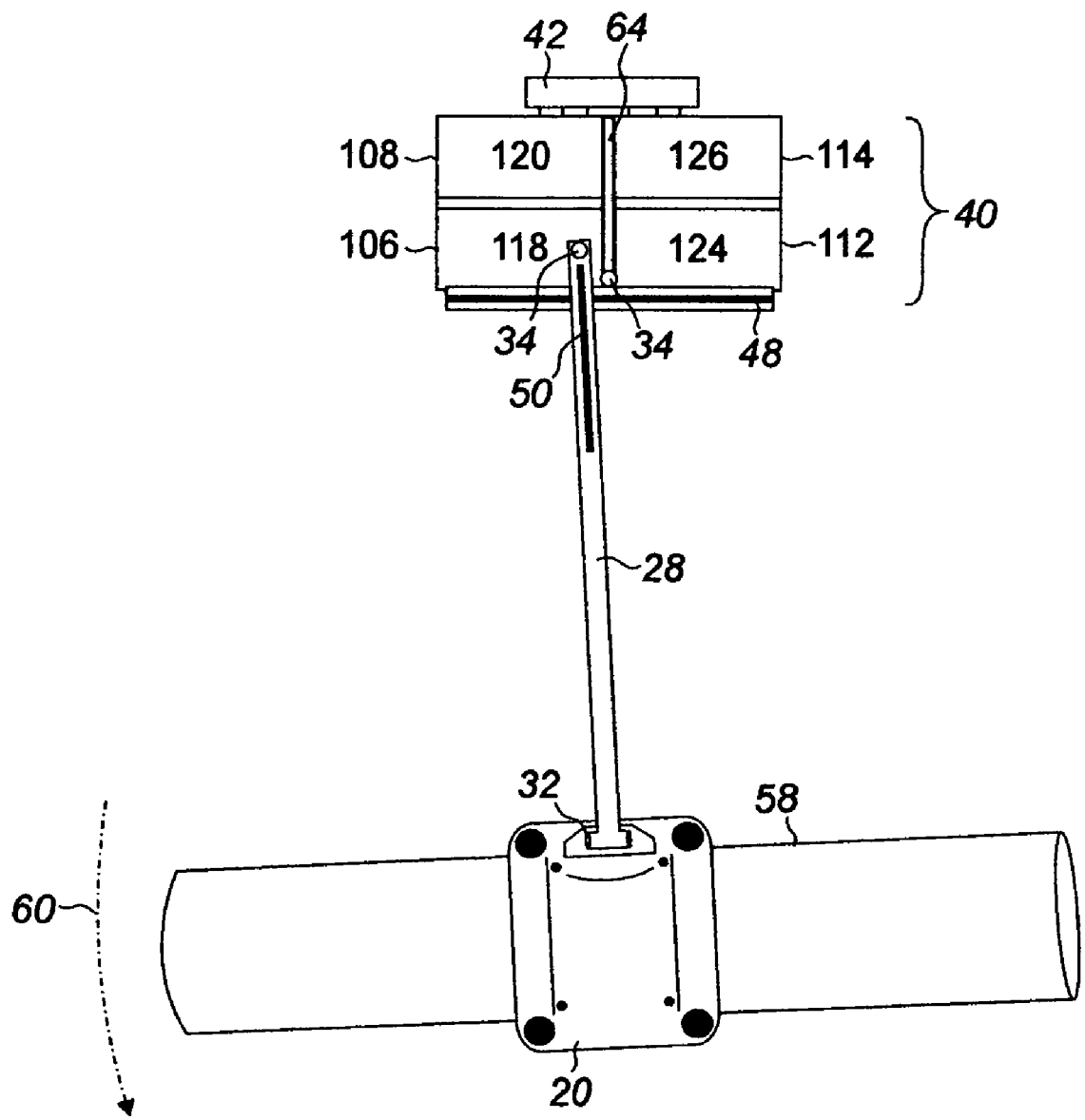
FIG. 5 shows the apparatus attached to an axle, illustrating upon axle deviation the relation between the indicator, axle, and sensors.

In FIGS. 4 and 5, sensor 40 may have two, four or six sensing areas, depending on how many axle adjustment mechanisms are available. Vehicles having only one axle adjustment should apply two sensing areas to sensor 40, a left and right side for instructing axle alignment. This allows instructions for adjusting only one side of the axle. Vehicles which have an axle adjustment on both sides should apply four sensing areas to sensor 40, which are shown in FIGS. 4 and 5. This allows instructions for adjusting either side of the axle. Other vehicles having a third axle adjustment of a transverse alignment should have six sensing areas applied to sensor 40. This allows instructions for aligning the axles transversely to the vehicle's centerline.

Figure 7:
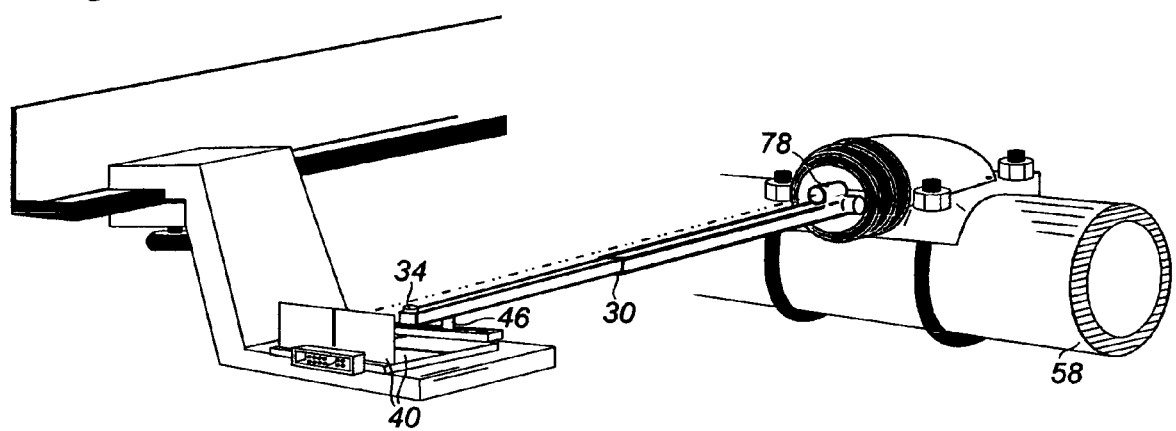
FIG. 7 shows a laser, ultra sonic or other distance measuring device used as the indicator.

FIG. 7 shows an electronic distance measuring device 78 used as the indicator and is shown without housing tube 56, flex boots 54 and cover 52. Measuring device 78 connects a slid able linkage 30 which extends in or out, coupled with indicator guide 46 for maintaining the relation between indicator 28 and sensor 40. Sensor 40 is shown positioned horizontal and or vertical when coupled with a laser, ultra sound or other distance measuring type device. Sensor 34 coupled with measuring device 78 and sensor 40 generates a correct axle alignment signal when positioned in a straight line with sensor centerline 64.

Figure 8:
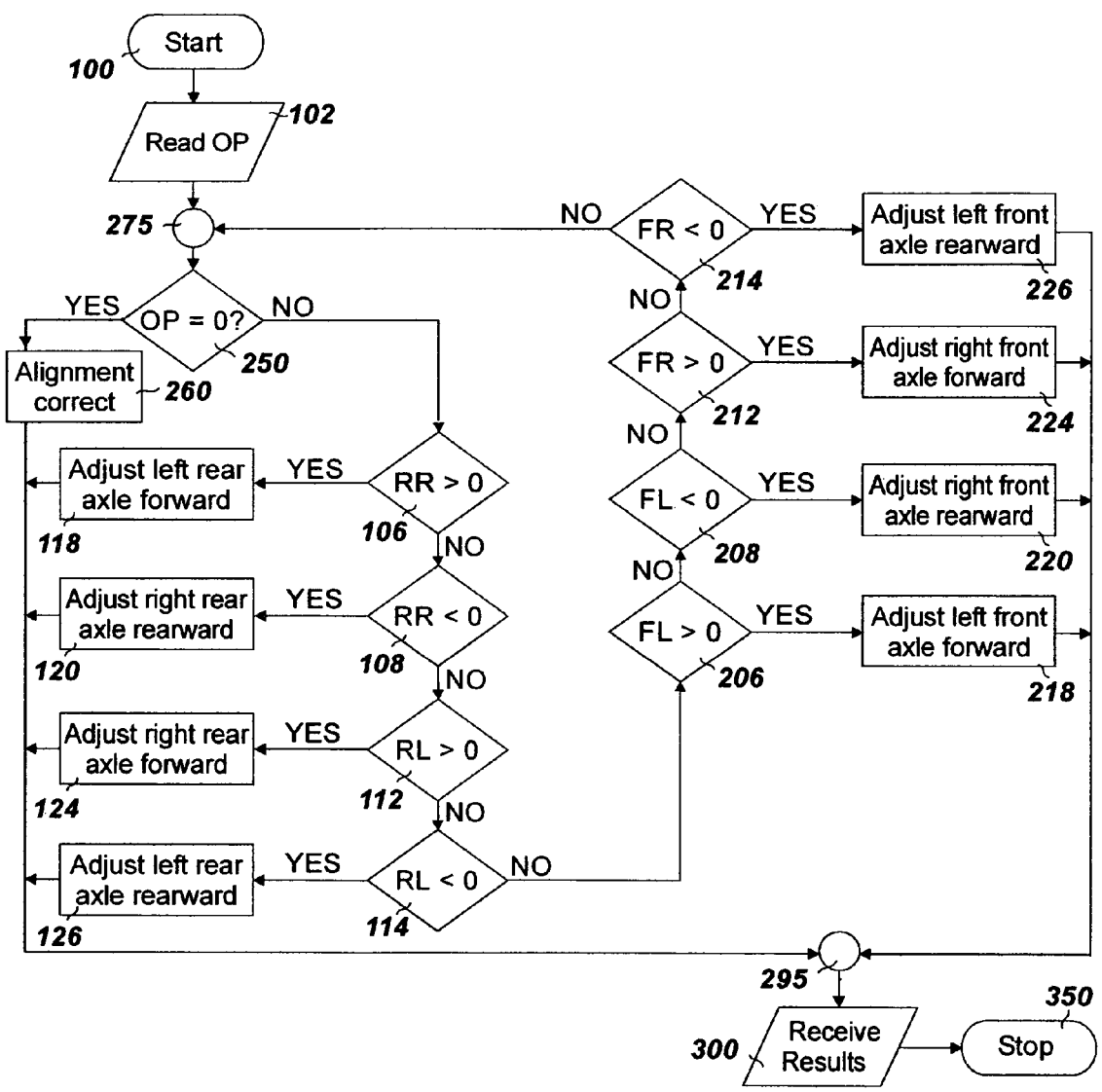
FIG. 8 shows a flowchart representation of a solution algorithm using structured programming.

Optional Computer Program—FIG. 8

FIG. 8 shows a program flowchart representation of a solution algorithm for basic structured programming illustrating the steps for determining axle realignment when using a distance type measuring device such as a laser, ultra sound or any other device for measuring distance applied to the present invention.

The complexity of the program will depend on how many axle adjustments mechanisms are available on the vehicle. For example, a vehicle with one axle adjustment mechanism on only one side of the axle will have a program for adjusting only that side of the axle. Vehicles having an adjustment mechanism on both sides of the axle will have a program for adjusting either side of that particular axle (shown in FIG. 8). Vehicles having a third adjustment for adjusting the axle transversely will have a program which includes the transverse adjustment.

In FIG. 8, the Start 100 begins the sequence for determining the steps for axle realignment of a vehicle having an adjustment mechanism on both sides of the axle. The Read OP 102 reads the operations of the rear axle and front axle position sensor's left and right side shown in FIGS. 4 and 5. Then (OP=0?) 250 is tested and executed if the condition is "YES" Alignment Correct 260 is indicated. Exiting at this time through Connector 295, Receive Results 300, End If, Stop 350.

If (OP=0?) 250 condition is "NO" the testing begins by checking if the value of RR is greater than 0, (RR>0) 106, an indication of Adjust Left Rear Axle Forward 118, Receive Results 300, End If, Stop 350 will be determined. If the value is less than 0, (RR<0) 108, an indication of Adjust Right Rear Axle Rearward 120, Receive Results 300, End if, Stop 350 will be determined. After RR is checked the operation process continues to RL.

If the value of RL is greater than 0, (RL>0) 112, an indication of Adjust Right Rear Axle Forward 124, Receive Results 300, End If, Stop 350 will be determined. If the value is less than 0, (RL<0) 114, an indication of Adjust Left Rear Axle Rearward 126, Receive Results 300, End If, Stop 350 will be determined. After RL is checked the process continues to FL.

If the value of FL is greater than 0, (FL>0) 206, an indication of Adjust Left Front Axle Forward 218, Receive Results 300, End If, Stop 350 will be determined. If the value is less than 0, (FL<0) 208, an indication of Adjust Right Front Axle Rearward 220, Receive Results 300, End If, Stop 350 will be determined. After FL is checked the process continues to FR.

If the value of FR is greater than 0, (FR>0) 212, an indication of Adjust Right Front Axle Forward 224, Receive Results 300, End If, Stop 350 will be determined. If the value is less than 0, (FR<0) 214, an indication of Adjust Left Front Axle Rearward 226, Receive Results 300, End If, Stop 350 will be determined.

After FR is checked, the process is repeated through Loop Connector 275, where the (OP=0?) 250 is tested. The sequence will repeat the steps until the loop is closed by determining that the value of Operations are equal to 0, (OP=0?) 250, Alignment Correct 260 is indicated. Exiting at this time through Connector 295, Receive Results 300, End If, Stop 350.

Figure 6:
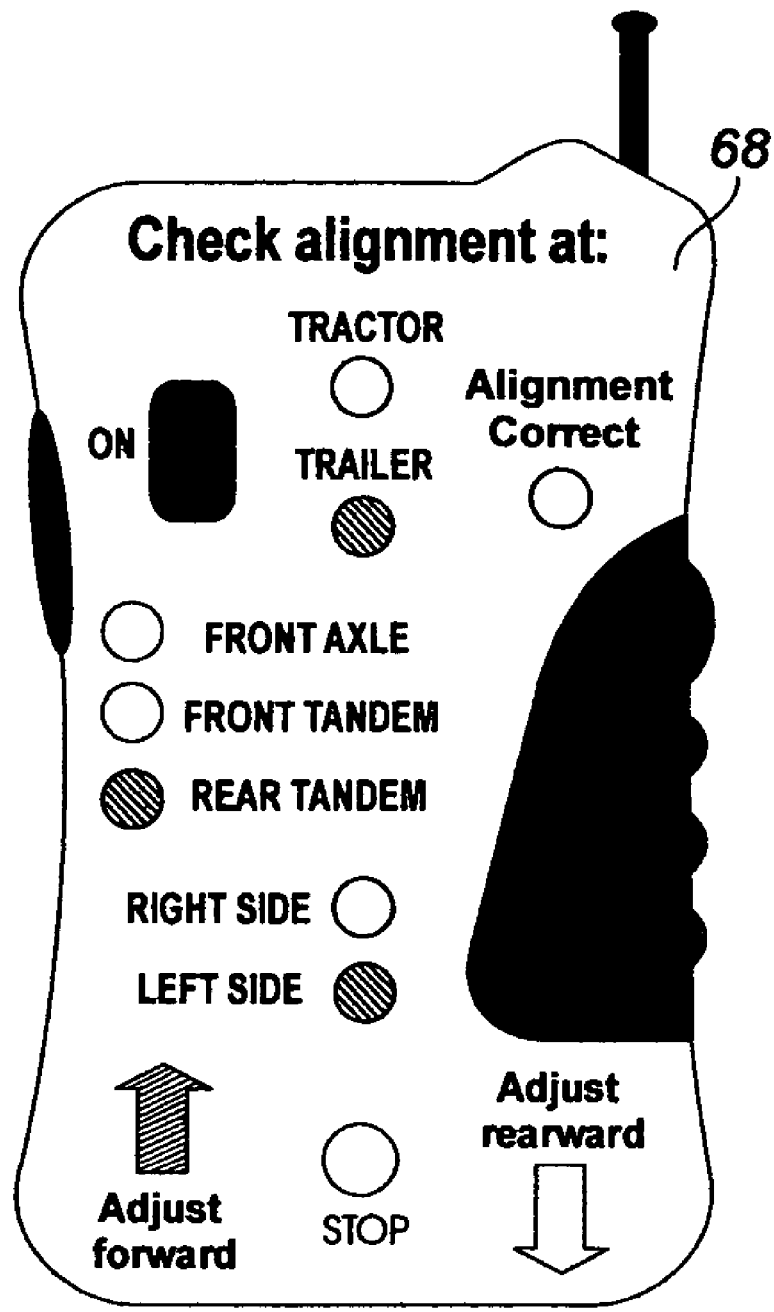
FIG. 6 shows a wireless receiver for instructing axle alignment to an operator.

Operation—FIGS. 4-6

FIG. 4 shows a top view of the apparatus in a correct axle alignment position with indicator 28 and position sensors 34 positioned in a straight line with one another and in the center of sensor centerline 64. The apparatus can be used at any time to check the axle's alignment whether the vehicle is being driven or not. The apparatus signals only when an axle becomes deviated or the operator uses the on switch located on receiver 68 when checking the axles alignment.

In FIG. 4, sensor 40 is divided into the four sensing areas with sensor centerline 64 dividing the left and right sides of sensor 40. The four divided areas are for detecting axle deviation of a vehicle having axle adjustment mechanisms on the left and right side. When indicator 28 is positioned on any sensing area, a signal is generated for instructing axle alignment. These signals include: lower left side 206 for instructing to adjust left front axle forward 218, upper left side 208 for instructing to adjust right front axle rearward 220, lower right side 212 for instructing to adjust right front axle forward 224, and upper right side 214 for instructing to adjust left front axle rearward 226.

In FIG. 5, upon axle 58 deviation 60, indicator 28 position changes relative to sensor 40. Indicator 28 is shown positioned on lower left side 106 of sensor 40. A signal is generated from lower left side 106 which instructs to adjust left rear axle forward 118. Other signals include: upper left side 108 for instructing to adjust right rear axle rearward 120, lower right side 112 for instructing to adjust right rear axle forward 124, and upper right side 114 for instructing to adjust left rear axle rearward 126.

FIG. 6 shows a wireless handheld receiver 68 which communicates the relation between the indicator and sensors as axle alignment instruction to the operator. Upon axle deviation a sound and light pulsates on receiver 68, warning that axle 58 deviation 60 has occurred. Receiver 68 is then illuminated with complete axle alignment instructions. The instructions explain which vehicle, which axle, which side of the axle, and which direction to realign the axle. The operator simply follows the receiver's instruction and without attaching any alignment measuring device to the vehicle, the operator adjusts the particular axle in a particular direction until receiver 68 indicates to stop. At this command indicator 28 and sensors 34 are now repositioned back to the center of sensor centerline 64 indicating that axle alignment is now correct.

Advantages

From the previous description, the following advantages becomes evident when using the instructions given by the present apparatus for axle alignment:
(1) decreases operating cost;
(2) increases fuel mileage;
(3) reduces tire wear;
(4) reduces component wear;
(5) improves highway safety;
(6) minimizes rolling resistance;
(7) decreases driver fatigue;
(8) improves handling performance of the vehicle.

Ramifications and Scope

Accordingly, the reader will see that the present invention can be made and designed in different ways in order to achieve the same results. Although the description above contains many specificities, these should not be construed as limiting the scope of the present invention, but as merely providing illustrations of some of the presently preferred embodiments of my apparatus.

For example, the structure of the present invention may have other shapes, such as circular, oval, triangular, etc. The parts may be made of any material such as aluminum, metal, plastic, fiberglass, etc. Also various sizes may be used for any of the parts such as indicators, sensors, mounting plate, housing tube, etc. The housing tube and indicator can be made to extend in or out as necessary for different applications.

The indicator may be any means to point, indicate or link the axle's alignment to the direction of the vehicle's centerline or link to any other component that will compare the axle's alignment to the vehicle's centerline. The indicator may be any variety of means such as mechanical linkage, laser, ultra sonic, magnetic, pressure sensors or any other means to point, touch, measure or indicate the relation between the indicator and the sensor.

The sensor which detects the indicator's position may be chosen from a variety of contact and non-contact sensors such as pressure sensors, magnetic sensors, proximity sensors, photoelectric using light or dark-energized sensors, capacitive sensors, inductive sensors, conductive plates, reflective sensors, various type switches or any other means for detecting the position of the indicator relative to the sensor.

A receiver, monitor or indicator may be used for receiving a signal which will display a light, sound, text or voice command that will indicate and instruct axle alignment. The signal may be sent from the axle alignment apparatus by wire, wireless, fiber optics, or any other means for transmitting signals to a receiver such as, an earpiece, headphone, remote hand held display, or device such as a computer for storing axle alignment instruction and data. Signals may also be transmitted wireless to a main dispatch terminal for notifying maintenance and operation managers that a particular axle of a particular vehicle is operating with an unsafe alignment.

The receiver may be placed onboard the vehicle in view of the driver. However, the receiver may also be placed off the vehicle, linked by wire, wireless or any other means to communicate when axle alignment is necessary or communicate during a routine alignment check when the vehicle is not in operation. For example, a vehicle may require an alignment check before the vehicle is assigned for operation. The technician may have a receiver which can link to and check any vehicle that has the present alignment apparatus installed.

Different locations can be used for attaching indicators or sensors to the vehicle. One or more indicators or sensors can be positioned at any angle under the vehicle and attached at any location on the axle or vehicle for detecting the axle's thrust line relative to the direction of the vehicle's centerline. Several indicators may face one another using one sensor. Indicators may be placed on each side of the axle, moving in or out in order to sense the axle's distance relative to the sensor or other component. The indicator may also be used to direct a link between one or more axles or to an adjacent component for providing the same function as the described present invention.

The indicators, sensors, and other components used by the present apparatus may be obtained from the McMaster-Carr Supply Company in Atlanta Ga., USA.

CONCLUSION

While I have described successful structures for constructing my alignment apparatus, it is possible in the art to make various modifications and still achieve the results desired without departure from the invention. Thus the scope of my apparatus for instructing axle alignment should be determined by the appended claims and their legal equivalents, rather than by the examples given.

I claim:

1. An apparatus onboard a vehicle for determining an axle's thrust line, comprising:
   means to point having a first end originating at said axle and a second end ending at a sensor mounted adjacent to said axle; and means to determine a relative position between said sensor and said means to point, whereby said thrust line of said axle with respect to a centerline of said vehicle is determined.

2. An apparatus according to claim 1, wherein said means to determine said relative position between said sensor and said means to point is selected from the group of, mechanical linkage, laser, photoelectric sensor, magnetic sensor, reflective sensor, ultra sonic, pressure sensor, switch, conductive plate, inductive or proximity sensor.

3. An apparatus according to claim 1, wherein the relation between said sensor and said means to point is maintained by a guide for allowing said means to point directional movement and stay in proximity to said sensor.

4. An apparatus according to claim 1, wherein said means to determine said relative position between said sensor and said means to point further includes a receiver for receiving at least one signal based on said relative position.

5. An apparatus according to claim 1, wherein said sensor includes one or more sensing areas.

6. A method for instructing axle alignment using an apparatus onboard a vehicle, comprising the steps of:
   providing means onboard said vehicle for determining a relative position of the axle's thrust line with respect to a centerline of said vehicle; providing at least one instruction to align said axle base on said relative position.

7. The method according to claim 6, wherein said relative position of said axle's thrust line with respect to said centerline is determined by a means to point having a first end originating at said axle and a second end ending at a sensor mounted adjacent to said axle.

8. The method according to claim 7, wherein further includes detecting movement between said means to point and said sensor.

9. The method according to claim 8, wherein further includes generating at least one signal based on said movement.

10. The method according to claim 8, wherein further includes selecting an appropriate step to align said axle base on said movement.

11. The method according to claim 9, wherein said signal is transmitted to a receiver.

12. The method according to claim 11, wherein said receiver communicates to an operator said instruction to align said axle.

13. The method according to claim 6, wherein said at least one instruction to align said axle is selected from the group of, which axle to align, which side of the axle to align, or which direction to align the axle.

14. A method for instructing realignment of an axle's thrust line, comprising the steps of:
   using onboard a vehicle means to detect movement of said axle's thrust line with respect to a vehicle's centerline; determining at least one axle alignment instruction base on said movement.

15. The method according to claim 14, wherein said at least one axle alignment instruction is selected from the group of, which axle to align, which side of the axle to align, or which direction to align the axle.

16. The method according to claim 14, wherein said movement of said axle's thrust line with respect to said vehicle's centerline is determined by one or more means to point having a first end originating at said axle and a second end ending at a sensor mounted adjacent to said axle and observing change in the relative position between said sensor and said means to point.

17. The method according to claim 16, wherein said change between said sensor and said means to point is used for selecting at least one step for aligning said axle.

* * * * *